United States Patent
Eul

(10) Patent No.: US 9,982,401 B2
(45) Date of Patent: May 29, 2018

(54) METHOD FOR CONTROLLING A ROAD FINISHING MACHINE WITH A WHEEL GEAR AND ROAD FINISHING MACHINE WITH A WHEEL GEAR

(71) Applicant: JOSEPH VOEGELE AG, Ludwigshafen/Rhein (DE)

(72) Inventor: Achim Eul, Mannheim (DE)

(73) Assignee: JOSEPH VOEGELE AG (DE)

( * ) Notice: Subject to any disclaimer, the term of this patent is extended or adjusted under 35 U.S.C. 154(b) by 0 days. days.

(21) Appl. No.: 15/435,887

(22) Filed: Feb. 17, 2017

(65) Prior Publication Data
US 2017/0233957 A1    Aug. 17, 2017

(30) Foreign Application Priority Data
Feb. 17, 2016  (EP) .................................... 16156102

(51) Int. Cl.
*E01C 19/48* (2006.01)
*B60W 30/18* (2012.01)
(Continued)

(52) U.S. Cl.
CPC .......... *E01C 19/48* (2013.01); *B60K 23/0808* (2013.01); *B60W 30/18063* (2013.01);
(Continued)

(58) Field of Classification Search
CPC .......... E01C 23/07; E01C 23/01; E01C 19/42; E01C 19/4873; E01C 19/22; E01C 19/48;
(Continued)

(56) References Cited

U.S. PATENT DOCUMENTS 5,311,964 A * 5/1994 Miyazaki ............. B60K 17/356
                                                180/242
5,819,870 A   10/1998 Braun
(Continued)

FOREIGN PATENT DOCUMENTS

DE           3911229 A1    10/1990
DE      102014010387 A1     1/2016
(Continued)

OTHER PUBLICATIONS

European Search Report dated Aug. 29, 2016, Application No. EP 16156102.2-1752, Applicant Joseph Voegele AG, 7 Pages.
(Continued)

*Primary Examiner* — Abigail A Risic
(74) *Attorney, Agent, or Firm* — Brooks Kushman P.C.

(57) ABSTRACT

A method is provided for controlling a road finishing machine with a material bunker for receiving paving material, a screed for compressing the paving material, a drivable rear wheel and a drivable front wheel. A rotational speed of the rear wheel of the road finishing machine is measured. Moreover, a travel speed of the road finishing machine is measured. A target driving torque of the front wheel of the road finishing machine is calculated based on the measured rotational speed of the rear wheel and the measured travel speed of the road finishing machine. Then, an actual driving torque of the front wheel is adjusted to the calculated target driving torque. The disclosure also relates to a road finishing machine.

19 Claims, 4 Drawing Sheets

(51) Int. Cl.
*E01C 19/42* (2006.01)
*B60K 23/08* (2006.01)

(52) U.S. Cl.
CPC ....... *B60W 30/18172* (2013.01); *E01C 19/42* (2013.01); *B60W 2300/17* (2013.01); *B60W 2420/52* (2013.01); *B60W 2520/10* (2013.01); *B60W 2520/26* (2013.01); *B60W 2520/28* (2013.01); *B60W 2720/403* (2013.01); *B60Y 2200/414* (2013.01); *E01C 2301/02* (2013.01)

(58) Field of Classification Search
CPC .... E01C 19/405; E01C 19/4833; E01C 21/00; E01C 21/08; E01C 2301/20; E01C 2301/00; E01C 2301/14; E01C 2301/40; E01C 2301/30; E01C 2301/02; E01C 2301/10
See application file for complete search history.

(56) References Cited

U.S. PATENT DOCUMENTS

| | | | | |
|---|---|---|---|---|
| 6,085,138 A | * | 7/2000 | Smith | B60K 23/04 172/3 |
| 6,230,496 B1 | | 5/2001 | Hofmann et al. | |
| 7,290,634 B2 | * | 11/2007 | Clare | B60K 23/0808 180/249 |
| 8,935,032 B2 | | 1/2015 | Kato et al. | |
| 9,534,349 B2 | * | 1/2017 | Horn | E01C 23/01 |
| 2006/0231310 A1 | * | 10/2006 | Suzuki | B60K 23/0808 180/197 |
| 2008/0208428 A1 | * | 8/2008 | Thompson | B60K 23/04 701/82 |
| 2016/0316616 A1 | * | 11/2016 | Brooks | A01M 7/0089 |
| 2017/0002525 A1 | * | 1/2017 | Horn | E01C 23/01 |

FOREIGN PATENT DOCUMENTS

| | | |
|---|---|---|
| EP | 0743219 B1 | 9/1999 |
| EP | 2676831 A1 | 12/2013 |
| JP | 4-77609 U | 7/1992 |
| JP | 9-21106 A | 1/1997 |
| JP | 2014-21075 A | 2/2014 |
| JP | 2014-208528 A | 11/2014 |
| WO | 2012/111159 A1 | 8/2012 |

OTHER PUBLICATIONS

Japanese Office Action dated Jan. 18, 2018, Application No. 2017-009217, 3 Pages.

* cited by examiner

METHOD FOR CONTROLLING A ROAD FINISHING MACHINE WITH A WHEEL GEAR AND ROAD FINISHING MACHINE WITH A WHEEL GEAR

CROSS-REFERENCE TO RELATED APPLICATIONS

This application claims foreign priority benefits under 35 U.S.C. § 119(a)-(d) to European patent application number EP 16156102.2, filed Feb. 17, 2016, which is incorporated by reference in its entirety.

TECHNICAL FIELD

The present disclosure relates to a road finishing machine with drivable wheels as well as to a method for controlling such a road finishing machine.

BACKGROUND

From EP 0 743 219 B1, a road finishing machine with rear and front wheel gears is known. The rear running gear includes two larger wheels while the front running gear includes a pair of smaller wheels. Within a working speed range, the rear wheels are permanently driven. The front wheels may be driven as required. There are provided sensors for scanning the speeds of the wheels. By means of the sensor data, a speed difference between the front and rear wheels is detected, and the speeds of the front and rear wheels are correspondingly corrected.

SUMMARY

It is an object of the present disclosure to provide a road finishing machine with drivable wheels as well as a method for controlling a road finishing machine with drivable wheels which are improved as concerns the driving of a road finishing machine.

The road finishing machine controlled in the method according the disclosure and the road finishing machine according to the disclosure comprise a material bunker preferably located in front in the paving direction of the road finishing machine for receiving paving material, in particular bituminous paving material. A screed for compressing the paving material is provided at the road finishing machine preferably at the rear in the direction of travel. The road finishing machine comprises a drivable rear wheel and a drivable front wheel for moving the road finishing machine. Preferably, at least two rear wheels and front wheels are provided which are each arranged in pairs. Two rear wheels provided in pairs may be drivable together or separately. Moreover, two front wheels provided in pairs may be drivable together or separately. Here, it may be advantageous for a wheel diameter of the rear wheels to be larger than a wheel diameter of the front wheels. To increase the stability of the road finishing machine, it may be advantageous to provide two pairs of front wheels. In this case, at least one of the pairs of front wheels may be drivable, preferably the rear pair of front wheels. As an alternative, both pairs of front wheels may be drivable, in particular drivable separately or together.

According to a first aspect of the disclosure, now a method for controlling such a road finishing machine is provided. Thereby, a rotational speed of a rear wheel of the road finishing machine is measured. This may be done by a wheel sensor unit, which may comprise, for example, an optical sensor. It is also conceivable to measure the rotational speed of two rear wheels, in particular two drivable rear wheels of the road finishing machine.

In the sense of the disclosure, the term "rotational speed" of a wheel is to comprise the angular velocity of the wheel. Moreover, the term "rotational speed" of the wheel is to include all values or measured values from which the angular velocity of the wheel at a uniform motion may be derived knowing the wheel diameter, in particular only knowing the wheel diameter, for example the rotational frequency of the wheel or the time history of the position of a certain measuring point on the wheel.

According to the disclosure, furthermore the travel speed of the road finishing machine is measured, in particular by a travel speed sensor unit. The travel speed of the road finishing machine designates the speed at which the road finishing machine as a whole moves over a ground.

Based on the measured rotational speed of the rear wheel and the measured travel speed of the road finishing machine, according to the disclosure, a target driving torque for the front wheel of the road finishing machine is calculated, preferably by a control unit of the road finishing machine. An actual driving torque of the front wheel is adjusted to this calculated target driving torque, preferably also by the control unit. To this end, a driving means of the front wheel may be actuated, preferably via a control mechanism.

So, the actual driving torque of the front wheel is adjusted based on the rotational speed of the rear wheel and the travel speed of the road finishing machine. The disclosure permits an automatic adjustment of the driving torque of the front wheel. Compared to, for example, a manual adjustment based on values from experience, the drive of the front wheel is, in the method according to the disclosure, adapted to each actual current operating situation, whereby wear of the wheels and other components may be reduced and the energy efficiency of the road finishing machine may be increased.

By considering, according to the disclosure, the measured travel speed of the road finishing machine in addition to the rotational speed of the rear wheel, a possibly occurring slip of the rear wheel may also be accounted for. Thereby, the undesired situation may be avoided that a measured rotational speed of a (partially) skidding rear wheel is introduced without correction into the calculation of the target driving torque for the front wheel. Thereby, the control of the front wheel is further adapted to the concrete operating situation and improved in view of wear and energy efficiency.

In particular, in the field of road finishing machines which typically move at very slow working speeds during the paving operation, for example at working speeds within a range of 1-20 m/min, the determination of the travel speed of the road finishing machine at a sufficient precision involves difficulties. Advantageously, the travel speed of the road finishing machine is measured with a travel speed sensor unit provided at the road finishing machine and comprising at least one radar sensor. The determination of the travel speed of the road finishing machine by means of a radar sensor even includes high precision at the slow paving speeds typical of road finishing machines. Moreover, radar sensors permit to observe the travel speed of the road finishing machine in real time. Speed variations of the road finishing machine are measured nearly instantaneously, which is advantageous for driving the front wheel in a manner optimally adapted to the situation.

The radar sensor is preferably adapted to emit electromagnetic radiation such that it is reflected from the ground on which the road finishing machine is moving. The reflected radiation is then in turn detected by the radar sensor. The travel speed of the road finishing machine may be deduced on the basis of a Doppler shift between the emitted and the detected signals. To ensure this functionality, the direction of detection and/or the direction of emission of the at least one radar sensor may be inclined downwards with respect to a horizontal plane.

The precision of the travel speed measurement may be further increased if the travel speed sensor unit comprises two radar sensors. Here, a first radar sensor may face forward in the direction of travel of the road finishing machine, while a second radar sensor faces rearward in the direction of travel of the road finishing machine. In this case, too, both radar sensors should be inclined downwards with respect to a horizontal plane, for example at an angle between 0° and 90°, preferably at an angle between 25° and 75°. The measured travel speed may be determined from the individual measured values of the two radar sensors by averaging.

Advantageously, the step of calculating the target driving torque of the front wheel includes the determination of an actually transmitted driving torque of the rear wheel, based on the measured rotational speed of the rear wheel and the measured travel speed of the road finishing machine. Based on this, the target driving torque of the front wheel can be set to be proportional to the detected actually transmitted driving torque of the rear wheel. These operations, too, are preferably performed by the control unit of the road finishing machine. By determining the actually transmitted driving torque of the rear wheel, a slip of the rear wheel based on the measured travel speed of the road finishing machine is accounted for. By adjusting the driving torque of the front wheel proportionally to the actually transmitted driving torque of the rear wheel, the front wheel drive may be purposefully employed for assisting the rear wheel drive. Depending on the concrete field of application, the degree of assistance may be determined via a suited proportionality constant.

Furthermore, the step of determining the actually transmitted driving torque of the rear wheel advantageously includes the determination of a slip of the rear wheel based on the measured rotational speed of the rear wheel and the measured travel speed, preferably also by the controlling system. To determine the slip of the rear wheel, it may be first determined, based on the known dimensions of the rear wheel, at which angular velocity, rotational speed, rotational frequency or the like the rear wheel would move if the rolling condition for the rear wheel was met and the road finishing machine moved at the measured travel speed. This value may then be compared to the measured rotational speed of the rear wheel to obtain the slip of the rear wheel. By means of the determined slip of the rear wheel, the actually transmitted driving torque of the rear wheel may then be determined or read out, preferably by the control unit, from a stored data record, in particular a characteristic curve diagram, to be available for determining the actual driving torque of the front wheel. The stored data record may include predetermined values for the actually transmitted driving torque of the rear wheel depending on the slip of the rear wheel. For a given slip, several values for the actually transmitted driving torque of the rear wheel may also be stored and selected depending on further, currently present operational conditions of the road finishing machine.

It is particularly advantageous for the rotational speed of two rear wheels of the road finishing machine to be measured, preferably independently. This can be done, for example, by a further wheel sensor unit at a second drivable rear wheel. The rotational speeds of the two rear wheels measured in this way may be compared, in particular by the control unit. Preferably, the target driving torque of the front wheel of the road finishing machine is then, as described above, determined based on the lower one of the measured rotational speeds of the rear wheels. This procedure mainly leads to improved results if differently large positive slips (i.e. at least a partial skidding of the wheel) are present at the two rear wheels, or a positive slip is only present at one rear wheel. It is ensured that for calculating the target driving torque of the front wheel, the conditions present at the wheel having the smaller positive slip are accounted for. Thereby, an appropriate and sufficient assistance to the rear wheels by the front wheels may be achieved.

According to a second aspect, the present disclosure relates to a road finishing machine of the type already described above as being according to the disclosure. The road finishing machine furthermore comprises the wheel sensor unit for measuring a rotational speed of the rear wheel and the travel speed sensor unit for measuring a travel speed of the road finishing machine. The travel speed sensor unit preferably comprises a radar sensor. Further advantageous embodiments of the travel speed sensor unit have already been described with respect to the method. Moreover, the road finishing machine comprises the control unit which is configured for calculating the target driving torque of the front wheel based on the measured rotational speed of the rear wheel and the measured travel speed of the road finishing machine and for adjusting the actual driving torque of the front wheel to the calculated target driving torque. Advantageously, the control unit is configured for carrying out further steps described as being performed by the control unit with respect to the method according to the disclosure.

The road finishing machine according to the disclosure is suited for performing the method according to the disclosure. Equally, the method according to the disclosure is suited for controlling the road finishing machine according to the disclosure.

Aspects of the present disclosure will be further illustrated with reference to an exemplified embodiment by means of the attached drawings.

DETAILED DESCRIPTION

Figure 1:
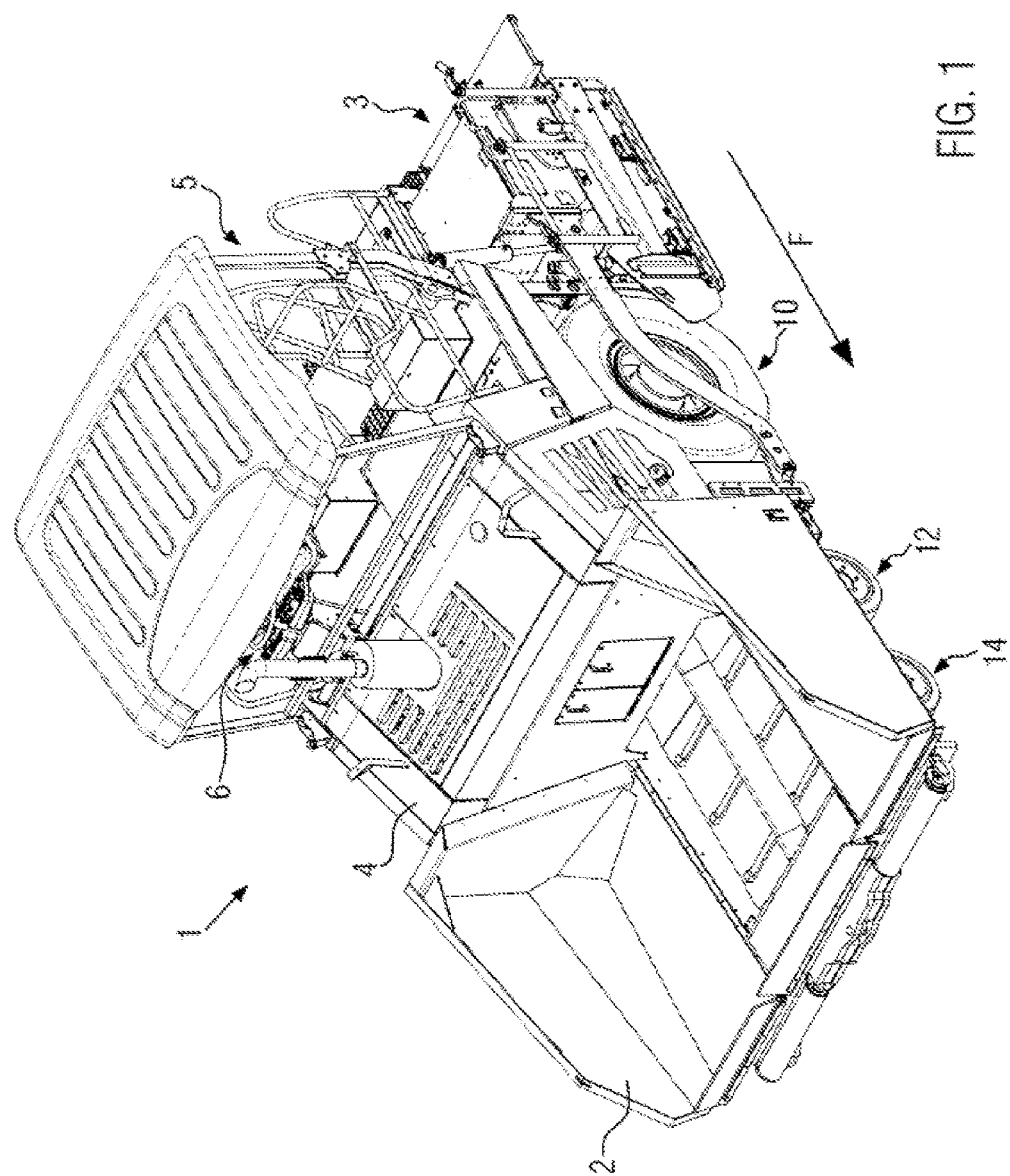
FIG. 1 shows a schematic representation of a road finishing machine according to the disclosure.

FIG. 1 shows a road finishing machine 1 according to the disclosure. It comprises, in the paving direction F at the front, a material bunker 2 for receiving paving material. At the rear in the paving direction F, a screed 3 is attached to the road finishing machine 1 (e.g., to a body of the road finishing machine) for compressing the paving material. The road finishing machine 1 comprises a chassis 4 and a control platform 5 attached thereon with operational controls 6 for controlling the road finishing machine 1. The road finishing machine 1 according to the shown embodiment comprises two drivable rear wheels 10. In the paving direction F in front of the rear wheels 10, the road finishing machine 1 comprises two drivable front wheels 12. The rear wheels 10 may be drivable together or separately. The front wheels 12, too, may be drivable together or separately. The shown road finishing machine 1 comprises a second pair of front wheels 14 for further stabilization. This pair may be drivable or not drivable, or it may be completely omitted.

Figure 2:
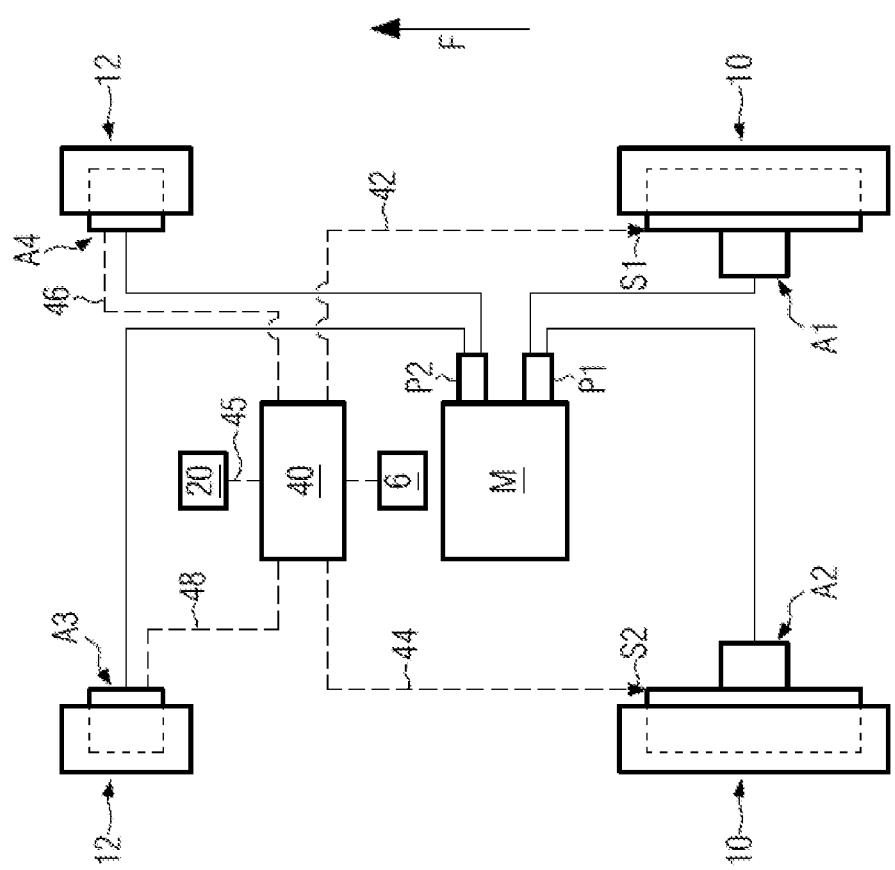
FIG. 2 shows a schematic representation of how the control unit is embedded into the systems of a road finishing machine according to the disclosure.

In the embodiment shown in FIG. 2, the two rear wheels 10 of the road finishing machine 1 are arranged along a common axis, and each has a separate power plant A1, A2, for example hydraulic motors. The pair of drivable front wheels 12, too, is arranged along a common axis and drivable separately each via a separate power plant A3, A4. Here, it is also possible to employ hydraulic motors. The power plants A1, A2, A3, A4 are each driven by a motor M of the road finishing machine 1. If the power plants A1, A2, A3, A4 are designed as hydraulic motors, between the motor M and the respective power plants A1, A2, A3, A4, one or several hydraulic pumps P1, P2 may be connected. These are driven by the motor M and in turn drive one or several ones of the power plants A1, A2, A3, A4. In the shown embodiment, two hydraulic pumps P1, P2, are provided, wherein a first hydraulic pump P1 drives the power plants A1, A2, of the rear wheels 10, and a second hydraulic pump P2 drives the power plants A3, A4 of the front wheels 12.

At each of the rear wheels 10, a wheel sensor unit S1, S2 is provided for measuring the rotational speed of the associated rear wheel 10. It is also conceivable that a wheel sensor unit S1, S2 is only provided at one rear wheel 10.

Figure 3:
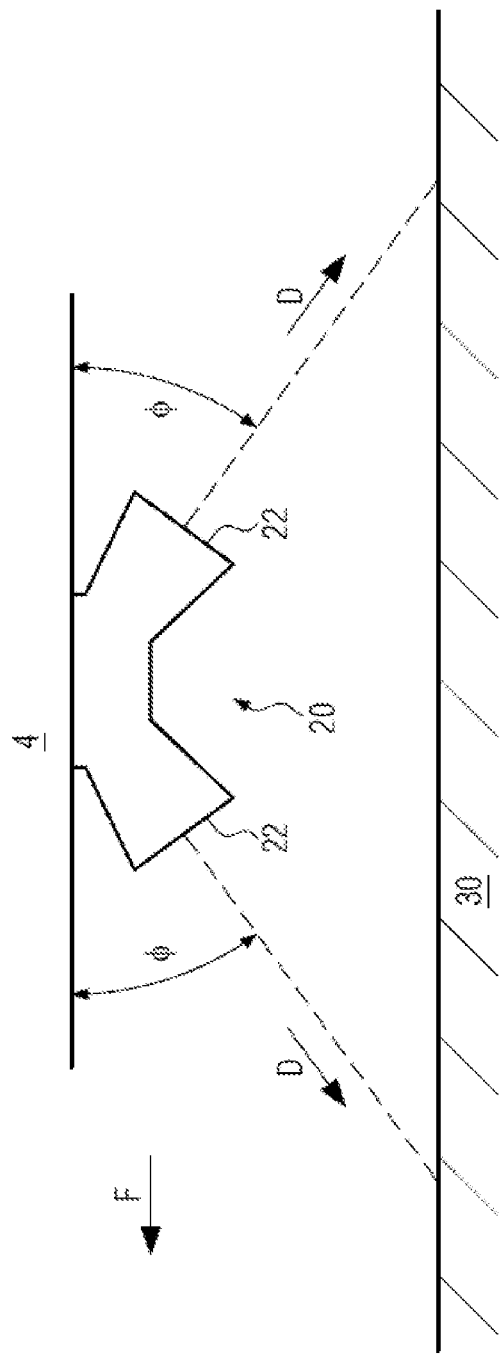
FIG. 3 shows a schematic representation of a travel speed sensor unit of a road finishing machine according to the disclosure according to an embodiment with two radar sensors.

Moreover, the road finishing machine 1 according to the disclosure comprises a travel speed sensor unit 20 for measuring a travel speed of the road finishing machine 1. Such a travel speed sensor unit 20 is represented in FIG. 3 in further detail. Advantageously, the travel speed sensor unit 20 comprises at least one radar sensor 22. According to the advantageous embodiment shown in FIG. 3, the travel speed sensor unit 20 comprises two radar sensors 22. These may be advantageously attached to a bottom side of the chassis 4 of the road finishing machine 1. It is also conceivable to attach the travel speed sensor unit 20 laterally to the road finishing machine 1. The operation of the radar sensors 22 is based on utilizing the Doppler effect. The radar sensors 22 are able to emit electromagnetic radiation in a direction of detection D. As is shown in FIG. 3, the directions of detection D of the radar sensors 22 are attached to the road finishing machine inclined downwards with respect to a horizontal plane at an angle $\Phi$. This ensures that the emitted electromagnetic radiation is reflected by the ground 30 on which the road finishing machine 1 is moving. The reflected radiation is then detected again by the respective radar sensor 22. In the process, the frequency of the detected radiation is measured. From the difference of the frequency of the detected electromagnetic radiation to the known frequency of the originally emitted electromagnetic radiation, the travel speed of the road finishing machine 1 may be determined with the assistance of the known angle of inclination $\Phi$ of the direction of detection D of the radar sensor 22. If two radar sensors 22 are provided, as is shown in FIG. 3, the measuring accuracy may be increased and the measurement may become more independent of any unevenness of the ground. To this end, one may for example average the obtained measured values.

The measured values of the wheel sensor units S1, S2 of the rear wheels 10 and the measured value of the travel speed sensor unit 20 are supplied to a control unit 40 via corresponding data lines 42, 44, 45 shown in FIG. 2. Based on the measured rotational speed of at least one rear wheel 10 and the measured travel speed of the road finishing machine 1, the control unit 40 calculates a target driving torque. This target driving torque is emitted as target driving torque for adjusting an actual driving torque of the front wheel 12 via control lines 46, 48 to the power plant A3, A4 of at least one front wheel 12. As is shown in FIG. 2, the target driving torque may also be emitted to both front wheels 12 or their power plants A3, A4.

Figure 4:
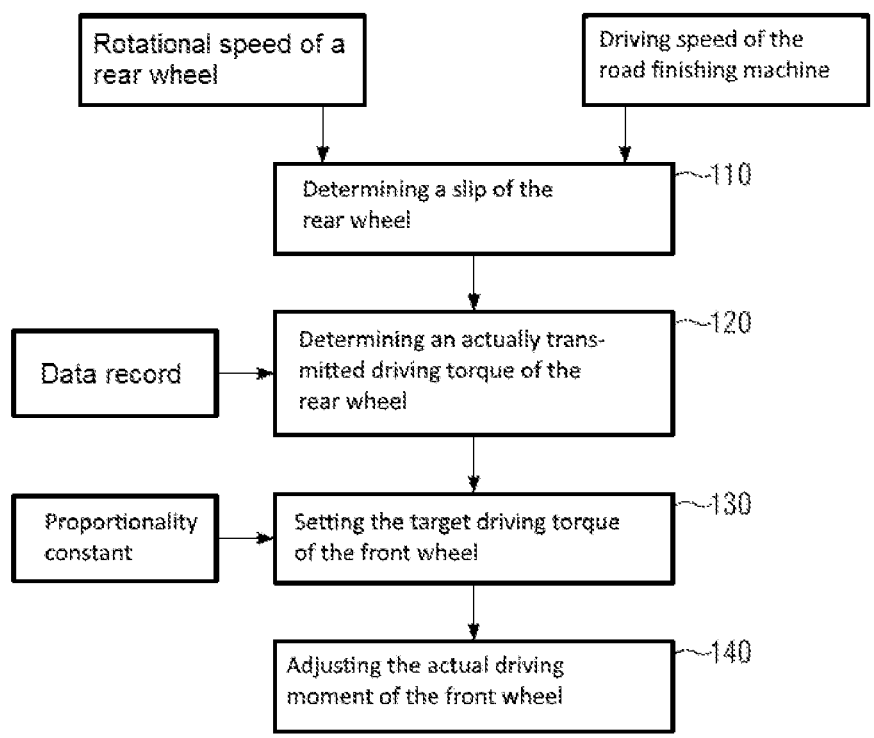
FIG. 4 shows a flowchart for illustrating the determination of the target driving torque for the front wheel according to an embodiment of the method according to the disclosure.

FIG. 4 illustrates more in detail how the control of the actual driving torque of the at least one front wheel 12 is effected based on the measured rotational speed of the at least one rear wheel 10 and the measured travel speed of the road finishing machine 1. First, in step 110, the slip of the respective rear wheel 12 is determined from the rotational speed of the rear wheel 10 and the travel speed of the road finishing machine 1. If the rotational speeds of two rear wheels 10 are determined, as is shown in FIG. 2, the smaller determined value may be used for step 110 and the further process. In step 120, an actually transmitted driving torque of the rear wheel 12 corresponding to the slip of the rear wheel 12 is read out from a stored data record. In step 130, the target driving torque of the front wheel 12 is set. In the process, the target driving torque of the at least one front wheel 12 is obtained by multiplication of the actually transmitted driving torque of the rear wheel 10 read out from the data record with a proportionality constant. As was already described, in step 140 the actual driving torque of the at least one front wheel 12 is adjusted to the calculated target driving torque. This is done by outputting the actual driving torque from the control unit 40 via the control lines 46, 48 to the corresponding drive unit A3, A4 of the at least one front wheel 12. The drive units A3, A4 may comprise a corresponding control mechanism which is designed to adjust the actual driving torque of the corresponding front wheel 12 to the target driving torque provided by the control unit 40.

It is conceivable that the stored data record may be adapted or re-entered by a user. This may be done, for example, via the operational controls 6 of the road finishing machine. It is also conceivable that an operator may adapt, preferably also via the operational controls 6, the proportionality constant used in step 120.

As one skilled in the art would understand, any of the above described units (e.g., wheel sensor units S1, S2, travel speed sensor unit 20, control unit 40) or other components may include suitable hardware and software, such as one or more processors (e.g., one or more microprocessors, microcontrollers and/or programmable digital signal processors) in communication with, or configured to communicate with, one or more storage devices or media including computer readable program instructions that are executable by the one or more processors so that the unit or other component may perform particular algorithms represented by the functions and/or operations described herein. Any of the above described units or other components may also, or instead, include one or more application specific integrated circuits, programmable gate arrays or programmable array logic, programmable logic devices, or digital signal processors.

While exemplary embodiments are described above, it is not intended that these embodiments describe all possible forms of the disclosure. In that regard, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. A method for controlling a road finishing machine having a material bunker for receiving paving material, a screed for compressing paving material, a drivable rear wheel, and a drivable front wheel, the method comprising:
measuring a rotational speed of the rear wheel;
measuring a travel speed of the road finishing machine;
calculating a target driving torque of the front wheel based on the measured rotational speed of the rear wheel and the measured travel speed of the road finishing machine; and
adjusting an actual driving torque of the front wheel to the calculated target driving torque;
wherein calculating the target driving torque comprises:
determining an actually transmitted driving torque of the rear wheel based on the measured rotational speed of the rear wheel and the measured travel speed of the road finishing machine; and
setting the target driving torque of the front wheel to be proportional to the determined actually transmitted driving torque of the rear wheel.

2. The method according to claim 1 wherein the travel speed of the road finishing machine is measured with a travel speed sensor unit provided at the road finishing machine and comprising at least one radar sensor.

3. The method according to claim 2 wherein a direction of detection of the at least one radar sensor is inclined downward with respect to a horizontal plane.

4. The method according to claim 2 wherein the travel speed sensor unit comprises two radar sensors including a first radar sensor being arranged at the road finishing machine facing forward in the direction of travel, and a second radar sensor being arranged at the road finishing machine facing rearward in the direction of travel.

5. The method according to claim 1 wherein determining the actually transmitted driving torque of the rear wheel comprises:
determining a slip of the rear wheel based on the measured rotational speed of the rear wheel and the measured travel speed; and
determining the actually transmitted driving torque of the rear wheel corresponding to the determined slip of the rear wheel by means of a stored data record.

6. The method according to claim 5 wherein the stored data record is a characteristic curve diagram.

7. The method according to claim 1 wherein the vehicle includes two drivable rear wheels, wherein measuring the rotational speed of the rear wheel comprises measuring rotational speed of each rear wheel, and wherein the target driving torque of the front wheel of the road finishing machine is determined based on a smaller one of the rotational speeds of the rear wheels.

8. A road finishing machine comprising:
a material bunker for receiving paving material;
a screed for compressing paving material;
a drivable rear wheel;
a drivable front wheel;
a wheel sensor unit for measuring a rotational speed of the rear wheel;
a travel speed sensor unit for measuring a travel speed of the road finishing machine; and
a control unit configured to:
calculate a target driving torque of the front wheel based on the measured rotational speed of the rear wheel and the measured travel speed of the road finishing machine; and
adjust an actual driving torque of the front wheel to the calculated target driving torque,
wherein the control unit is configured to, when calculating the target driving torque;
determine an actually transmitted driving torque of the rear wheel based on the measured rotational speed of the rear wheel and the measured travel speed of the road finishing machine; and
set the target driving torque to be proportional to the determined actually transmitted driving torque of the rear wheel.

9. The road finishing machine according to claim 8 wherein the travel speed sensor unit comprises at least one radar sensor.

10. The road finishing machine according to claim 9 wherein a direction of detection of the at least one radar sensor is inclined downward with respect to a horizontal plane.

11. The road finishing machine according to claim 8 wherein the travel speed sensor unit comprises two radar sensors including a first radar sensor arranged at the road finishing machine facing forward in the direction of travel, and a second radar sensor arranged at the road finishing machine facing rearward in the direction of travel.

12. The road finishing machine according to claim 8 wherein the control unit is, when determining the actually transmitted driving torque of the rear wheel, configured to:
determine a slip of the rear wheel based on the measured rotational speed of the rear wheel and the measured travel speed; and
determine the actually transmitted driving torque of the rear wheel corresponding to the determined slip of the rear wheel by means of a data record stored in a characteristic curve diagram memory of the road finishing machine.

13. The road finishing machine according to claim 8 further comprising another drivable rear wheel, wherein
the wheel sensor unit is configured to measure rotational speed of the other rear wheel; and
the control unit is configured to determine the target driving torque of the front wheel based on a smaller one of the measured rotational speeds of the rear wheels.

14. A road finishing machine comprising:
a material bunker for receiving paving material;
a screed for compressing paving material;
first and second drivable rear wheels;
a drivable front wheel;
first and second wheel sensor units for measuring rotational speed of the first and second rear wheels, respectively;
a travel speed sensor unit for measuring a travel speed of the road finishing machine; and
a control unit configured to:
calculate a target driving torque of the front wheel based on a smaller one of the measured rotational speeds of the rear wheels and the measured travel speed of the road finishing machine; and
adjust an actual driving torque of the front wheel to the calculated target driving torque.

15. The road finishing machine according to claim 14 wherein the travel speed sensor unit comprises at least one radar sensor.

16. The road finishing machine according to claim 15 wherein a direction of detection of the at least one radar sensor is inclined downward with respect to a horizontal plane.

17. The road finishing machine according to claim 14 wherein the travel speed sensor unit comprises two radar sensors including a first radar sensor arranged at the road finishing machine facing forward in the direction of travel, and a second radar sensor arranged at the road finishing machine facing rearward in the direction of travel.

18. The road finishing machine according to claim 14 wherein the control unit is, when calculating the target driving torque, configured to:
   determine an actually transmitted driving torque based on the smaller one of the measured rotational speeds of the rear wheels and the measured travel speed of the road finishing machine; and
   set the target driving torque to be proportional to the determined actually transmitted driving torque.

19. The road finishing machine according to claim 18 wherein the control unit is, when determining the actually transmitted driving torque, configured to:
   determine a slip based on the smaller one of the measured rotational speeds of the rear wheels and the measured travel speed; and
   determine the actually transmitted driving torque corresponding to the determined slip by means of a data record stored in a characteristic curve diagram memory of the road finishing machine.

* * * * *